May 4, 1954     A. O. ROBERTS     2,677,441
AUTOMATIC BRAKE ADJUSTER

Filed Sept. 6, 1952     2 Sheets-Sheet 1

A. O. ROBERTS
INVENTOR.

BY

ATTORNEYS

May 4, 1954  A. O. ROBERTS  2,677,441
AUTOMATIC BRAKE ADJUSTER
Filed Sept. 6, 1952  2 Sheets-Sheet 2

A.O. ROBERTS
INVENTOR.
BY E. C. McRae
J. C. Faulkner
L. H. Oster
ATTORNEYS

Patented May 4, 1954

UNITED STATES PATENT OFFICE 2,677,441

AUTOMATIC BRAKE ADJUSTER

Albert O. Roberts, Dearborn, Mich., assignor to Ford Motor Company, Dearborn, Mich., a corporation of Delaware Application September 6, 1952, Serial No. 308,201

1 Claim. (Cl. 188—79.5)

This invention relates generally to automatic adjusters for brake mechanisms of motor vehicles.

An object of the present invention is to provide an automatic brake adjuster which is positive in action, trouble free in operation, and comprises a relatively few parts so that it can be economically manufactured and assembled. The automatic brake adjuster is particularly adapted for use in connection with a brake applying lever and forms an adjustable connection between the lever and a power device for actuating the lever to apply the brake mechanism. It comprises an adjustable screw threaded member having a pin and slot connection with a ratchet arranged concentric with the screw and slidably mounted upon one end thereof. A pawl is slidably mounted upon a pin extending parallel to the screw and ratchet and engages the ratchet teeth and cooperates therewith to effect the required adjustment.

Other objects and advantages of this invention will be made more apparent as this description proceeds, particularly when considered in connection with the accompanying drawings, wherein.

Figure 1:
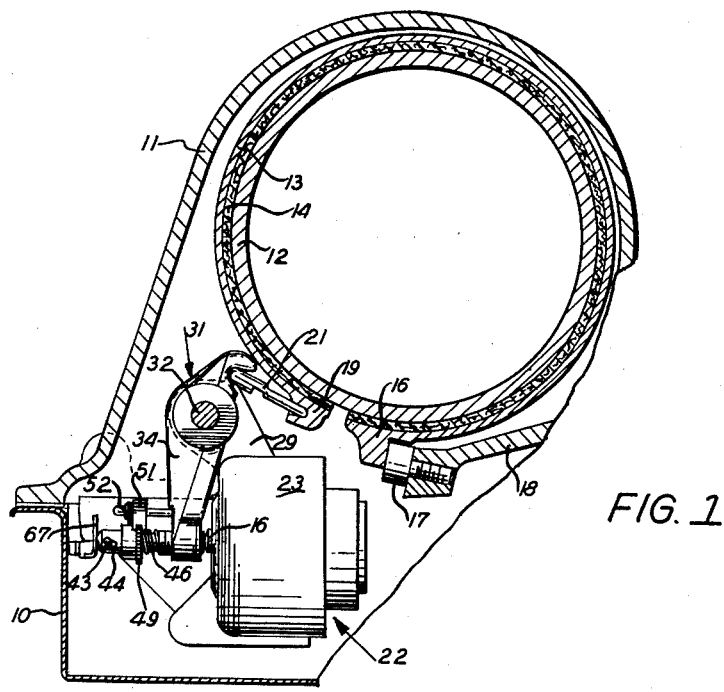
Figure 1 is a transverse cross-sectional view through a transmission incorporating the brake adjuster of the present invention.

Referring now particularly to Figure 1 of the drawings, the reference character 11 indicates the case of a transmission of the automatic type. An oil pan 10 is secured to the lower portion of the transmission case. A drum 12 is arranged to be braked by a brake band 13 carrying friction lining 14 in order to control certain elements (not shown) of the transmission. The brake band 13 is formed of flexible metal and completely encircles the brake drum 12, and carries on its inner periphery the friction lining for frictional engagement with the drum.

The end 16 of the brake band is enlarged and is arranged to engage and be anchored by an anchor stud 17 carried by a flange 18 of the transmission case. The opposite end 19 of the brake band is hook-shaped and is adapted to be engaged by a thrust link 21 to apply the brake band and lining to the drum.

Power for applying the brake is adapted to be supplied by means of a servo assembly 22. The servo assembly 22 is adapted to be assembled as a unit and then bolted to the transmission case. It comprises a cast cylinder 23 within which is reciprocably mounted a piston 24 carrying a piston rod 26 extending through the end wall of the piston. Formed integrally with the cylinder 23 is a projecting flange 27 adapted to be bolted to the transmission case by bolts 28.

Extending upwardly therefrom and formed integrally with the cylinder 23 of the servo assembly is a flange 29 forming a support for the brake applying lever 31. The brake applying lever 31 is pivotally mounted intermediate its ends upon the flange 29 by means of a pivot pin 32.

The brake applying lever 31 has a short upper arm 33 formed with a hook-shaped end portion engaging the end of the thrust link 21, and a long lower arm 34 arranged to be actuated by the piston rod 26. The end of the piston rod 26 abuts the end of an adjusting screw 36 threaded into the end of the long arm 34 of the brake applying lever. It will be apparent that adjustment of the adjusting screw 36 in the lever will compensate for wear of the friction lining 14 of the brake band 13. While such adjustment could of course be made manually, the adjustment would require the removal of the oil pan 12. The present invention makes manual adjustment unnecessary since the adjusting screw 36 is automatically adjusted as the brake lining wears.

The adjusting screw 36 has a threaded shank 37 received in the brake applying lever and a cylindrical extension 38 of reduced diameter. Slidably received upon the reduced end portion 38 of the adjusting screw 36 is a hollow ratchet member 39 having a shank portion 41 provided with a closed dome-shaped end 42.

A pair of oppositely disposed angular slots 43 are formed in the shank 41 of the ratchet member 39. Each slot is elongated and arranged at an acute angle to the axis of the ratchet, with the slots at opposite sides of the shank being oppositely inclined. A pin 44 is carried by the reduced end portion 38 of the adjusting screw 36, and projects completely therethrough and extends a distance beyond the opposite sides thereof so as to be received within the elongated slots 43 formed in the shank of the ratchet. It will be apparent from the foregoing that relative axial movement between the adjusting screw 36 and the ratchet member 39 will, because of the interconnection between the pin 44 and slots 43, cause a rotation of the ratchet member relative to the adjusting screw.

Figure 2:
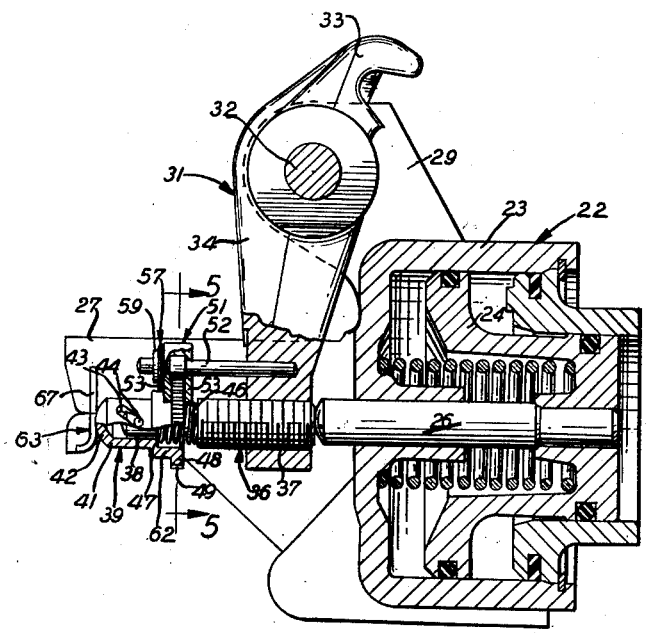
Figure 2 is an enlarged cross-sectional view of a portion of Figure 1 showing the servo mechanism and the brake adjuster.
Figure 3:
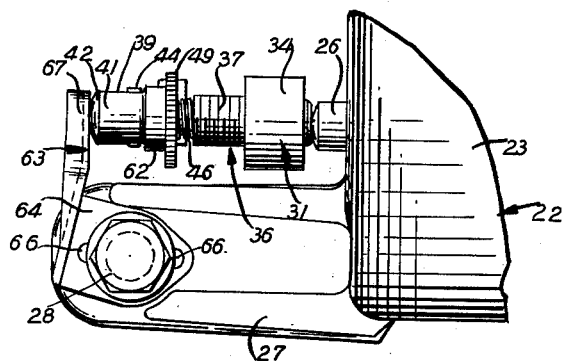
Figure 3 is a bottom plan view of the construction shown in Figure 2.

A coil spring 46 surrounds the reduced end portion 38 of the adjusting screw, with one end of the spring abutting the shoulder between the reduced end portion and the threaded shank of the adjusting screw and with the other end abutting a shoulder 47 formed in the interior of the hollow ratchet member 39. The spring normally urges the ratchet member away from the adjusting screw and maintains it in the position in Figure 2 in which the pin 44 is against the bottom of the slots 43.

The ratchet member 39 is formed with an integral flange 48 projecting outwardly therefrom and provided with a series of ratchet teeth 49 on its periphery. The ratchet teeth 49 are adapted to be engaged by a pawl member 51 slidably mounted upon a pin 52 mounted in the long arm 34 of the brake applying lever 31. The pin 52 extends parallel to the adjusting screw 36, and permits movement of the pawl member 51 along the pin as the adjusting screw 36 is adjusted relative to the brake applying lever.

The pawl 51 is bifurcated to form side flanges 53 embracing opposite sides of the flange 48 of the ratchet member so as to insure axial movement of the pawl with the ratchet.

Intermediate the side flanges 53 of the pawl member 51, the latter is cut away to form a recess 54. A projecting tooth 56 is thus formed on the periphery of the pawl member 51 between the side flanges 53 thereof. The pawl member 51 is adapted to be rocked about the axis of the pin 52 from a position in which the pawl tooth 56 engages a ratchet tooth 49 to a position in which the pawl tooth 56 is clear of the ratchet teeth 49 so that the ratchet can be angularly adjusted. The central slot 54 in the pawl member 51 provides clearance for this rocking movement.

Figure 4:
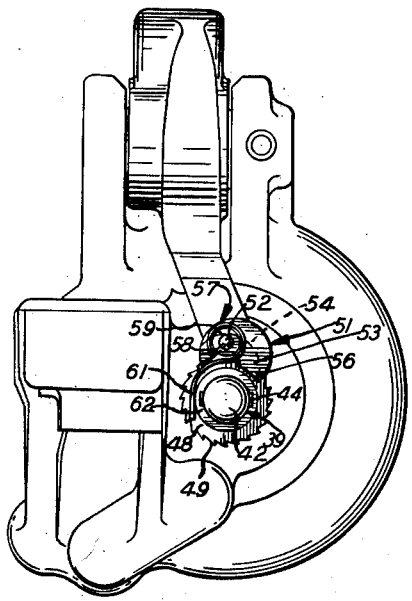
Figure 4 is a fragmentary enlarged end elevation of a portion of the construction shown in Figure 2.
Figure 5:
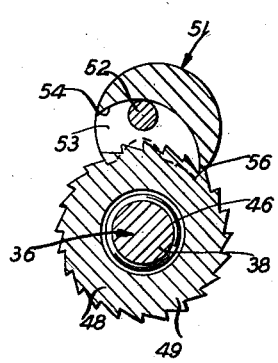
Figure 5 is an enlarged cross sectional view taken on the plane indicated by the line 5—5 of Figure 2.

The pawl is normally urged in a clockwise direction as seen in Figures 4 and 5 by means of a spring 57. One end 58 of the spring 57 is anchored in a hole in the hub 59 of the pawl member. The body of the spring 57 encircles the hub 59 and the opposite end 61 of the spring is elongated and engages the outer periphery of the enlarged portion 62 of the shank 41 of the ratchet member 39.

A stop member 63 formed of sheet metal has a mounting flange 64 secured to the flange 27 of the servo assembly by means of pins 66 and the mounting bolt 28. The stop member 63 also has a flange 67 positioned at right angles to the axis of the adjusting screw 36 and ratchet member 39 and positioned in the path of the dome-shaped end 42 of the ratchet member.

When hydraulic power is applied to the piston 24 in the cylinder 23, the resulting movement of the piston causes the end of the piston rod 26 to abut the end of the threaded shank 37 of the adjusting screw 36 and swings the brake applying lever 31 about its pivot 32 to apply the brake band and its lining to the drum. During this brake applying movement of the brake lever, the end 42 of the ratchet member 39 abuts the flange 67 of the stop member so that continued movement of the brake applying lever and the adjusting screw 36 carried thereby results in relative axial movement between the adjusting screw and ratchet, against the action of spring 46. This relative movement causes a related rotative movement of the ratchet member 39 relative to the adjusting screw 36, by reason of the interconnection between the pin 44 carried by the screw and the slots 43 in the ratchet member. In the event the lining of the brake band is worn sufficiently to require a sufficient movement of the brake applying lever 31, the resulting rotation of the ratchet member 39 causes the tooth 56 of the pawl member 51 to engage the next adjacent ratchet tooth 49. Due to the end load upon the threaded shank 37 of the adjusting screw, the latter does not at this time rotate in the arm 34 of the brake applying lever 31. After the brake has been released, however, and the load removed, the adjusting screw is free to rotate in the brake applying lever, and is so rotated by reason of the subsequent relative axial extension of the adjusting screw 36 and ratchet member 39 effected by the compression coil spring 46. During this relative extension, the ratchet member 39 is held from rotation by means of the pawl member 51, and the pin and slot connection between the ratchet member and the adjusting screw consequently effects a rotation of the threaded shank 37 of the screw in the long arm 34 of the brake applying lever 31. This adjustment is automatically made during brake application and release whenever the wear of the lining requires, and consequently a uniform clearance is maintained between the lining and the drum. If the predetermined amount of wear has not taken place, the ratchet 39 returns to its original position relative to the pawl member 51.

It will be understood that the invention is not to be limited to the exact construction shown and described, but that various changes and modifications may be made without departing from the spirit and scope of the invention, as defined in the appended claim.

What is claimed is:

In an automatic adjuster for a brake mechanism having a brake applying member and a power device for actuating said member to apply the brake mechanism, an adjusting member having a threaded portion threadedly engaging said brake applying member and extending therethrough for engagement by said power device, said adjusting member having a cylindrical shank at the end opposite said threaded portion, a guide pin mounted upon said brake applying member and extending parallel to said adjusting member, a ratchet arranged concentric with said adjusting member and slidably embracing the cylindrical shank thereof, said ratchet having a pair of slots formed in the opposite side walls thereof with said slots being inclined relative to the axis of said ratchet and with the slots on opposite sides thereof being oppositely inclined with respect to each other, a pin extending radially through the end of the shank of said adjusting member with the opposite ends thereof projecting into said elongated slots in the ratchet, spring means urging said ratchet toward the end of the shank of said adjusting member, a pawl slidably and rotatably mounted upon said guide pin and having a toothed portion adjacent said ratchet, spring means tending to rotate said pawl about the axis of said guide pin to hold the toothed portion of the pawl in locking engagegment with the peripheral teeth of said ratchet, and a stationary abutment in alignment with the end of said ratchet for engagement thereby during brake application to effect relative sliding movement between said ratchet and screw so that relative movement between said pin and slot rotates said ratchet relative to said adjusting screw.

References Cited in the file of this patent

UNITED STATES PATENTS

| Number | Name | Date |
| --- | --- | --- |
| 685,380 | Johnson | Oct. 29, 1901 |
| 2,096,463 | Moody | Oct. 19, 1937 |
| 2,184,683 | Shuman | Dec. 26, 1939 |
| 2,382,223 | Hicks | Aug. 14, 1945 |